United States Patent [19]

Hoff

[11] Patent Number: 4,650,383
[45] Date of Patent: Mar. 17, 1987

[54] CARGO STABILIZER FOR UTILITY VEHICLES

[76] Inventor: Phillip L. Hoff, 413 Center St., N. Muskegon, Mich. 49445

[21] Appl. No.: 703,037

[22] Filed: Feb. 19, 1985

[51] Int. Cl.$^4$ .................................................. B60P 7/06
[52] U.S. Cl. .................................... 410/149; 410/150; 410/152
[58] Field of Search .............................. 410/143–153, 410/130–139; 211/7, 94, 105.1, 105.3, 105.5, 123, 124

[56] References Cited

U.S. PATENT DOCUMENTS

| | | | |
|---|---|---|---|
| 2,608,420 | 8/1952 | Eck | 410/149 |
| 2,873,695 | 2/1959 | Tobin | 410/145 |
| 2,894,462 | 7/1959 | Newcomer et al. | 410/143 X |
| 2,942,560 | 6/1960 | Shultz | 410/144 |
| 2,988,019 | 6/1961 | Stough | 410/148 |
| 3,052,485 | 9/1962 | Keener | 410/145 |
| 3,115,102 | 12/1963 | Rolfe, Jr. et al. | 410/130 |
| 3,799,070 | 3/1974 | Munson | 410/149 |
| 4,085,685 | 4/1978 | Stone | 410/146 |
| 4,121,849 | 10/1978 | Christopher | 410/38 |
| 4,195,738 | 4/1980 | O'Neal | 211/41 |
| 4,256,425 | 3/1981 | Burgess et al. | 410/149 |
| 4,332,511 | 6/1982 | Twyman | 405/178 |
| 4,464,089 | 8/1984 | Allen | 410/143 X |

Primary Examiner—Robert B. Reeves
Assistant Examiner—Scott H. Werny
Attorney, Agent, or Firm—Price, Heneveld, Cooper, Dewitt & Litton

[57] ABSTRACT

A cargo stabilizer is provided for utility vehicles, such as vans, pickup trucks, and the like, which have a cargo carrying bed. The stabilizer prevents the cargo from shifting either fore-to-aft or laterally in the vehicle bed. The stabilizer comprises two guide rails attached lengthwise along the opposite sidewalls of the vehicle bed in a generally mutually parallel relationship. A crossbar is slidingly supported on the guide rails, and includes latches at the opposite ends of the crossbar to adjustably and positively connect the crossbar to the guide rails at a selected location. The crossbar is longitudinally adjustable between locked and unlocked positions, and includes abutment surfaces at its opposite ends which directly abut the sidewalls of the vehicle bed when the crossbar is in the locked position. Hence, substantially all laterally directed stabilizing forces that develop in retaining the cargo in its selected position are transferred directly to the sidewalls of the vehicle's bed, and do not on the guide rails themselves, thereby providing very secure stabilizing support, without requiring a heavy-duty stabilizer construction.

36 Claims, 6 Drawing Figures

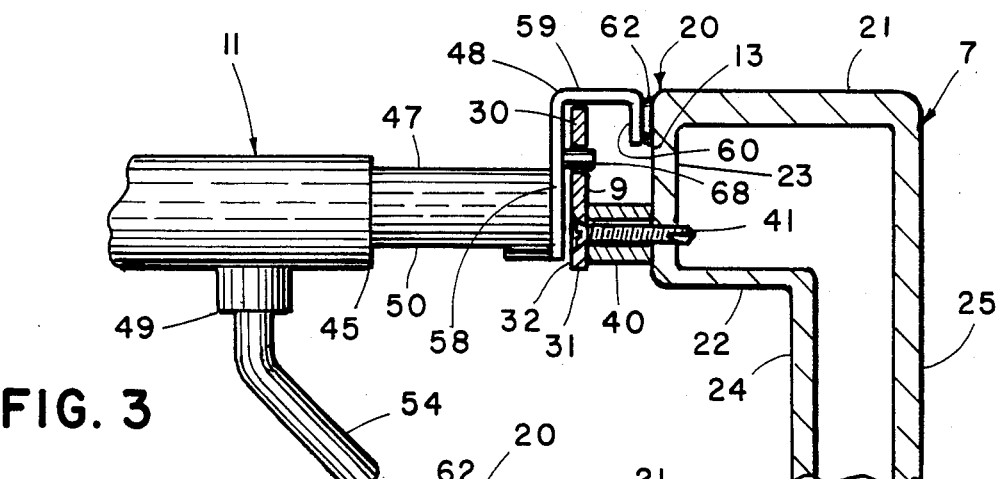
FIG. 3
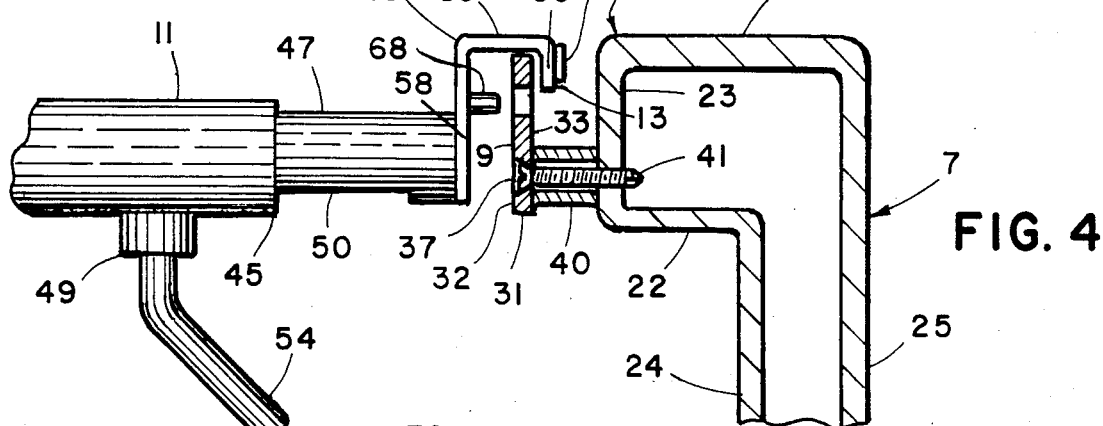
FIG. 4
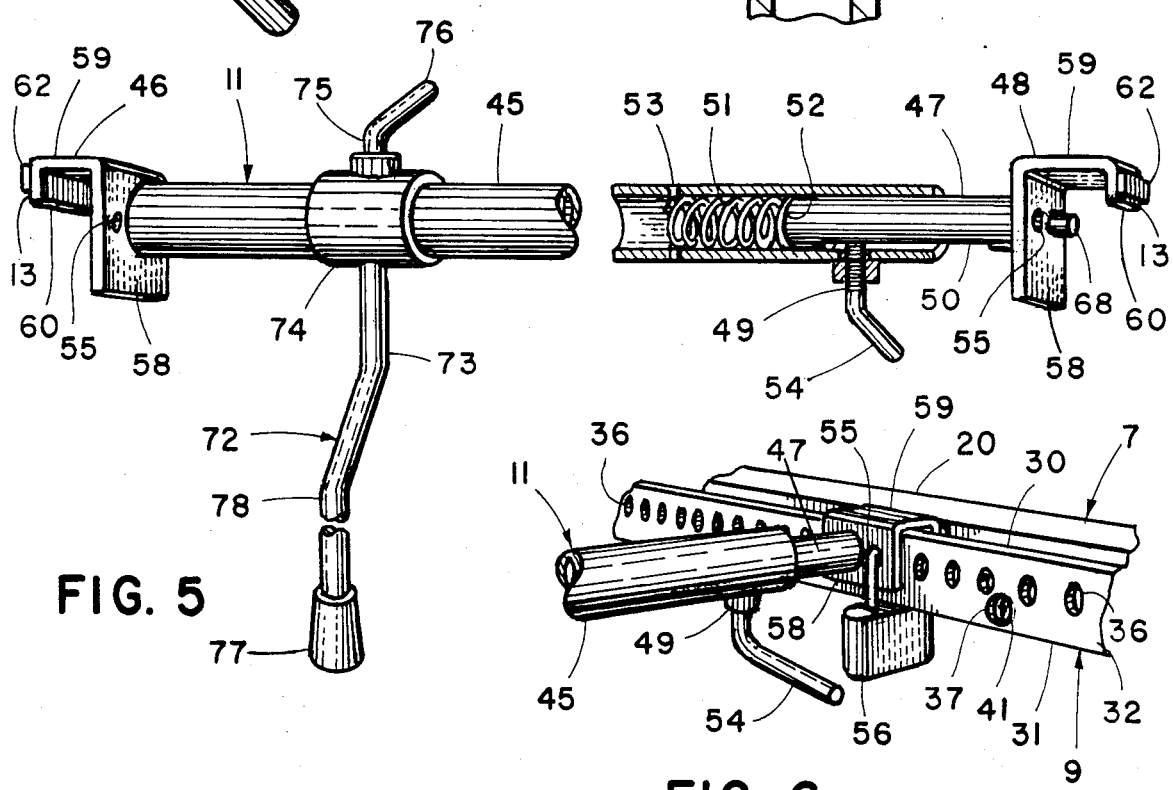
FIG. 5
FIG. 6

CARGO STABILIZER FOR UTILITY VEHICLES

BACKGROUND OF THE INVENTION

The present invention relates to cargo retaining equipment, and in particular to a unique cargo stabilizer, which is particularly designed for aftermarket installation in conventional utility vehicles, such as pickup trucks, vans and the like.

Conventional utility vehicles, such as pickup trucks and vans are currently very popular with homeowners who use these vehicles as a primary mode of transportation in place of the family car. Many of these vehicles are custom painted, well maintained, and in the case of pickup trucks, may have a cap or tarpaulin covering the truck bed. Campers and toppers are also installed in the bed of pickup trucks. Homeowners typically use these vehicles to transport recreational equipment, such as bicycles, trail bikes, snowmobiles, outboard motors and the like, as well as home improvement materials, such as refrigerators, stoves, lumber, bricks, paint and ladders. Such utility vehicles are also used for other household applications, such as carrying groceries, camping equipment, furniture and other similar bulky articles.

In most instances, the load or cargo being transported does not completely fill the vehicle bed. As a result, the cargo will shift fore-to-aft along the length of the bed when the vehicle is accelerated and decelerated, or it will slide side-to-side across the width of the vehicle bed when the vehicle goes around a curve or corner, unless the cargo is appropriately restrained. When articles shift within the vehicle bed, they can slam with considerable force into the walls of the vehicle bed, or into other articles in the vehicle bed. As a result, the walls of the vehicle may become chipped or dented, which detrimentally affects the aesthetic appearance and value of the vehicle. Further, the articles being transported may themselves become damaged. Moreover, the shifting articles can present a safety hazard if they fall out of the vehicle, or distract the driver of the vehicle.

Truck and van owners have only a few non-commercial, aftermarket types of stabilizers available to them which can be used to prevent or minimize the shifting of cargo in the vehicle bed. Most of these cargo stabilizers, as exemplified by U.S. Pat. No. 2,608,420 to Eck, entitled LOAD BRACING STRUCTURE FOR VEHICLES, are designed for use in commercial carriers, and are only effective in preventing the longitudinal movement of an article. When the vehicle is accelerated or decelerated, the articles still can shift laterally across the width of the bed, or when the vehicle goes around a corner. A few stabilizers, such as that disclosed in U.S. Pat. No. 4,121,849 to Christopher, entitled STABILIZER FOR ARTCICLES CARRIED WITHIN A VEHICLE BED prevent, to some extent, the lateral movement of small articles. However, the stabilizer is really a vertical hold-down that does not positively prevent lateral movement of the cargo. Also such stabilizers cannot prevent the lateral shifting of large articles, such as refrigerators, etc., which extend above the height of the crossbar. Further, these and other stabilizers available on the market are quite complicated in design, expensive to manufacture, difficult to install, and are usually considered aesthetically unpleasing. Because they attach to the top of the vehicle bed, they can interfere or prevent the use of covers, caps, campers and the like, on the vehicle bed.

Therefore, a need exists for an uncomplicated, economical cargo stabilizer, which can prevent not only the longitudinal movement of an article in the vehicle bed, but also the lateral movement of that article. Further, a need exists for a stabilizer which is easily adjustable so as to prevent the lateral movement of articles of various shapes and sizes. A need also exists for a stabilizer which is inexpensive to manufacture, easily and quickly installed in an aftermarket environment, and does not substantially affect the aesthetic appearance of the vehicle, or hinder the use of covers, caps, toppers, campers and the like.

SUMMARY OF THE INVENTION

One aspect of the present invention is to provide a uniquely uncomplicated and economical cargo stabilizer for conventional utility vehicles, such as vans, pickup trucks, and the like which have a cargo carrying bed. A stabilizer prevents cargo from shifting either fore-to-aft or laterally in the vehicle bed. A stabilizer comprises two guide rails attached lengthwise along the opposite sidewalls of the vehicle bed in a generally mutually parallel relationship. A crossbar is slidingly supported on the guide rails for fore-to-aft movement thereon, and latches adjustably and positively connect the opposite ends of the crossbar to the guide rails at one of a number of selected locations. The crossbar is longitudinally adjustable between locked and unlocked positions, and includes abutment surfaces at its opposite ends, which contact the sidewalls of the vehicle bed when the crossbar is in the locked position. Hence, substantially all laterally directed stabilizing forces that develop as a result of retaining the cargo in its selected position, are transferred directly to the vehicle bed sidewalls, and do not act on the guide rails themselves, thereby providing very secure stabilizing support, without requireing a heavy-duty stabilizer construction. For example, the guide rails need not be constructed of a heavy gauge, expensive metal. Also, they can be perforated to mate with the crossbar latches, and they need not be attached to the sidewalls of the vehicle bed by numerous heavy-duty fasteners, such as through bolts or the like, which must be secured on the blind side of the vehicle sidewall.

The guide rails are preferably attached to the vehicle bed sidewalls by a plurality of spacers and sheet metal-type screws which particularly adapt the stabilizer for easy aftermarket installation and removal. The guide rails are positioned below the top of the vehicle bed, so that the stabilizer does not interfere with or hinder the use of vehicle bed covers, caps, campers or other similar accessories.

Cargo stabilizing arms may be adjustably connected with the crossbars for positioning on opposite sides of the cargo to prevent lateral movement. The cargo stabilizing arms can be moved along the longitudinal axis of the crossbar so as to accommodate loads of various widths, and can be rotated about the longitudinal axis of the crossbar to accommodate loads of various heights. A locking system locks the crossbar to the vehicle to prevent unauthorized removal of the cargo.

The stabilizer is relatively uncomplicated in construction, inexpensive to manufacture, easy to install and remove as an aftermarket accessory even by relatively unskilled personnel, and does not substantially affect the aesthetic appearance of the vehicle to which it is attached, or interfere with the use of covers, campers, toppers or the like.

These and other features, advantages and objects of the present invention will be further understood and appreciated by those skilled in the art by reference to the following written specification, claims and appended drawings.

BRIEF DESCRIPTION OF THE DRAWINGS

FIG. 3 is a fragmentary, vertical cross-sectional view of the cargo stabilizer, showing a crossbar member in a locked position with an associated guide rail.

FIG. 4 is a fragmentary, vertical cross-sectional view of the cargo stabilizer, showing the crossbar member in an unlocked position with the associated guide rail.

FIG. 5 is a perspective view of the cargo stabilizer, with one end thereof broken away to reveal internal construction.

FIG. 6 is a fragmentary, perspective view of the cargo stabilizer, showing one end of the crossbar in a locked positon with the associated guide rail.

DETAILED DESCRIPTION OF THE PREFERRED EMBODIMENTS

Figure 1:
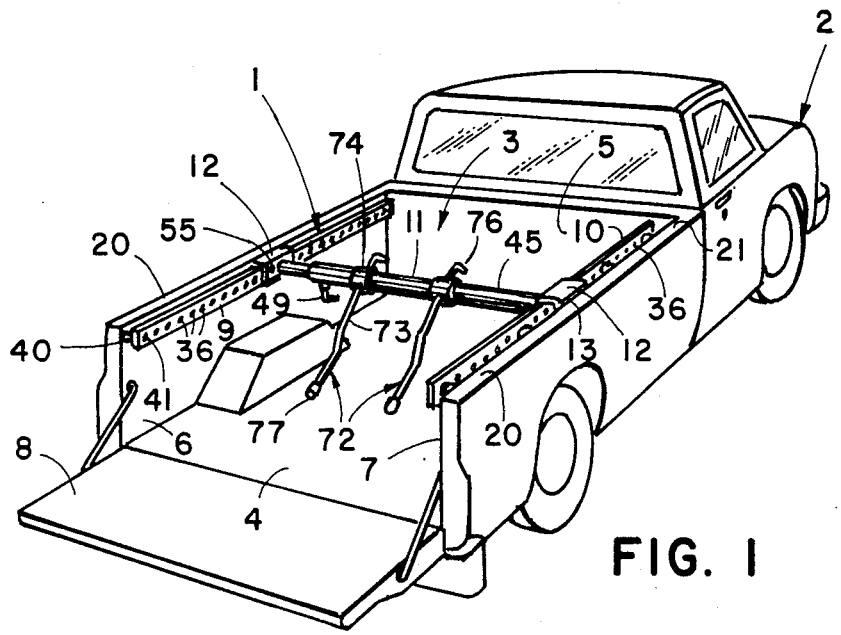
FIG. 1 is a rear perspective view of a cargo stabilizer embodying the present invention, shown attached to a conventional utility vehicle.

For purposes of description herein, the terms "upper," "lower," "right," "left," "rear," "front," "vertical," "horizontal" and derivitives thereof shall relate to the invention as oriented in FIGS. 1 and 3-4. However, it is to be understood that the invention may assume various alternative orientations, and installation step sequences, except where expressly specified to the contrary.

The reference numeral 1 (FIG. 1) generally designates a cargo stabilizer embodying the present invention. Cargo stabilizer 1 is particularly designed as an aftermarket accessory for conventional, utility vehicles, such as vans, and the illustrated pickup truck 2, which have a cargo carrying bed 3, defined by a floor panel 4, a front wall 5, opposite sidewalls 6 and 7, and a rear wall or gate 8. Cargo stabilizer 1 comprises two guide rails 9 and 10, which are attached lengthwise along the opposite sidewalls 6 and 7 of vehicle bed 3 in a generally mutually parallel relationship. A crossbar 11 is slidingly supported on guide rails 9 and 10 for fore-to-aft movement therealong. Latches 12 are located at the opposite ends of crossbar 11 to adjustably and positively connect the ends of crossbar 11 to guide rails 9 and 10 at one of many selected positions. Crossbar 11 is longitudinally adjustable between locked and unlocked positions, as illustrated in FIGS. 3 and 4, and includes abutment surfaces 13 at its opposite ends, which contact the sidewalls 6 and 7 of vehicle bed 3 when crossbar 11 is in the locked position. As a result of this contact, substantially all laterally directed stabilizing forces that develop as a result of retaining the cargo in the selected position within vehicle bed 3 are transferred directly to the sidewalls 6 and 7 of the vehicle bed, and do not act on guide rails 9 and 10, thereby providing very secure stabilizing support, without requiring a heavy-duty stabilizer construction.

Pickup truck 2 is a conventional vehicle, which as best illustrated in FIGS. 3 and 4, includes a hollow, inwardly oriented flange or lip 20 along the upper edge of the sidewalls 6 and 7 of bed 3. In the illustrated example, lip 20 includes an upper flange 21, a lower flange 22, and a web wall 23 extending therebetween. Sidewall 7 includes interior and exterior panels 24 and 25 respectively, which are closely spaced together, thereby preventing conventional tools from accessing the interior of hollow lip 20. Typically, the pickup truck sidewalls 6 and 7 are constructed from stamped sheet steel.

Figure 2:
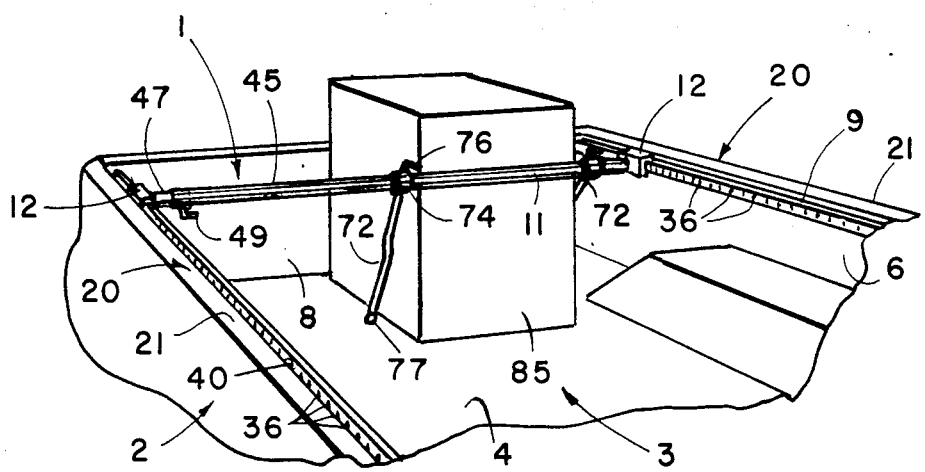
FIG. 2 is a fragmentary perspective view of a rearward portion of the vehicle, with the cargo stabilizer shown in a reversed orientation, and retaining cargo in place.

Guide rails 9 and 10 (FIGS. 1 and 2) comprise elongate strips that are shaped to extend substantially along the entire length of the sidewalls 6 and 7 of vehicle bed 3, adjacent the upper edge thereof. In the illustrated example, guide rails 9 and 10 are substantially identical in shape and construction, and comprise rectangularly shaped strips or bars of steel, or other similar, rigid material. Guide rails 9 and 10 are substantially rigid against bending in the vertical plane (as oriented in the installed condition), and are semi-rigid or slightly flexible in the horizontal plane. In one example of the present cargo stabilizer, guide rails 9 and 10 have a thickness of around 3/16 inch, a width of approximately 1 inch, and a length of 6-8 feet, and are constructed from a mild, cold rolled carbon steel. It is to be understood that the specific dimensions contained herein are merely exemplary, and that the present invention contemplates other sizes and dimensions. The various parts of cargo stabilizer 1 are preferably chrome plated to prevent oxidation. Guide rails 9 and 10 have a generally rectangular lateral cross-sectional shape, and include upper and lower edges 30 and 31 respectively (FIGS. 3 and 4), and opposite side faces 32 and 33. The opposite ends of guide rails 9 and 10 preferably have rounded corners for safety.

The illustrated guide rails 9 and 10 (FIG. 6) include a plurality of holes or apertures 36 which extend therethrough, between their opposite side faces 32 and 33. Apertures 36 are preferably spaced substantially uniformly along the length of guide rails 6 and 7, and their centers are aligned longitudinally, generally along the longitudinal center line of guide rails 9 and 10. In this example, apertures 36 are cylindrical in shape, and have a diameter of approximately 9/32 inch. Countersunk fastener apertures 37 are also provided in guide rails 9 and 10 to facilitate attaching the guide rails to the opposite sidewalls 6 and 7 of the vehicle bed 3, as described in greater detail hereinafter. Each illustrated guide rail 6 and 7 includes five fastener apertures, which are spaced evenly apart along the lower portions of guide rails 9 and 10, and at the opposite ends thereof.

Guide rails 9 and 10 (FIGS. 3 and 4) are spaced inwardly from the adjacent sidewalls 6 and 7 of pickup truck 2 to accommodate proper locking action of crossbar 11, as described hereinafter. In the illustrated cargo stabilizer 1, a plurality of spacers 40 are positioned between the web walls 23 of lips 20, and the interior faces 33 of the associated guide rails 9 and 10. Spacers 40 are substantially identical in construction, and rigidly retain guide rails 9 and 10 a predetermined distance inwardly from web walls 23 in a parallel relationship therewith. In one example of the present invention, spacers 40 are annular in shape, and have a length of approximately 7/16 inch. In this example, fasteners 41 extend through fastener apertures 37, and mating spacers 40, thereby retaining spacers 40 in place. Preferably, fasteners 41 are of the type which can attach guide rails 9 and 10 and spacers 40 to the web walls 23 of the vehicle sidewalls 6 and 7 without requiring access to the blind side or interior end of the fastener, as would be required by a through bolt and nut arrangement. Examples of suitable fasteners are pop rivets, self-tapping screws, and the illustrated sheet metal-type screws 41. In this manner, even relatively unskilled personnel can attach the cargo stabilizer 1 to a wide variety of different types of vehicles without requiring any special tools or special fasteners. Furthermore, cargo stabilizer 1 can also be readily removed from the vehicle by the user when desired.

Crossbar 11 (FIGS. 1 and 2) spans between guide rails 9 and 10, and is slidingly supported on the upper edges 30 of the guide rails. The illustrated crossbar 11 (FIG. 5) comprises a rigid, cylindrically shaped tube 45, having an inverted J-shaped end fitting 46 rigidly attached to one end of tube 45. The opposite end of tube 45 has an adjustable, rod-shaped leg 47 telescopingly received therein, with an inverted J-shaped end fitting 48 rigidly mounted on the exterior end of leg 47. A set screw 49 is mounted on tube 45, adjacent leg 47, and is adapted to engage a flat, lower surface 50 of leg 47 to lock the leg at a desired position within tube 45. Contact between set screw 49 and flat 50 retains end fitting 48 in the desired angular position with respect to tube 45. A coil spring 51 is positioned between the interior end 52 of leg 47, and a stop pin 53, which is fixedly mounted in tube 45. Coil spring 51 resiliently urges leg 47 outwardly toward a locked position with guide rails 9 and 10, as described in greater detail hereinafter. Preferably, set screw 49 is located on the lower side of tube 45 to avoid interference with vehicle covers, and the like, and includes a handle 54 shaped for grasping to facilitate manual manipulation of the set screw.

End fittings 46 and 48 (FIGS. 5 and 6) are substantially identical in shape, and include a vertical base plate 58, a top flange 59 extending perpendicularly from the upper edge thereof, and an outer flange 60 spaced apart from vertical flange 58, and oriented parallel therewith. Vertical plate 58 has a vertical length substantially coextensive with the width of guide rails 9 and 10. The lower surfaces of top flanges 59 abut the upper edges 30 of guide rails 9 and 10 to slidably support crossbar 11 thereon. The outer surfaces of the end fitting outer flanges 60 define the abutment surfaces 13, which are shaped to contact or abut the adjacent web walls 23 of the vehicle sidewalls 6 and 7 for purposes to be described in greater detail hereinafter. In this example, non-scratch pads 62, constructed of rubber or other similar materials, are attached to abutment surfaces 61 to prevent marring or scratching the adjacent surfaces of the vehicle sidewalls 6 and 7.

In this example, latches 12, which positively and adjustably connect the ends of crossbar 11 to guide rails 9 and 10, comprise two locator pins or lock pins 68, which are rigidly attached to central portions of vertical plates 58 and protrude generally perpendicularly therefrom. Lock pins 68 are shaped to be closely received within two mating apertures 36 in guide rails 9 and 10, so as to positively locate crossbar 11 in a selected position, and prevent both fore-to-aft and vertical movement therefrom. Lock pins 68 are shifted between a locked position, as shown in FIG. 3, and an unlocked position, as shown in FIG. 4, by translation of end leg 47 in the following fashion. When crossbar 11 is placed on guide rails 9 and 10, crossbar 11 is in the unlocked position (FIG. 4), wherein end leg 47 is retracted into the free end of tube 45, so that the outermost end surfaces of both lock pins 68 are spaced inwardly from the adjacent side faces 32 of guide rails 9 and 10. Coil spring 51 is compressed between the inner end 52 of end leg 47 and stop pin 53, and set screw 49 is tightened against the adjacent flat 50 on end leg 47 to retain crossbar 11 in the unlocked position (FIG. 4). In the unlocked position (FIG. 4), crossbar 11 can be slid freely in a fore-to-aft direction along the length of guide rails 9 and 10 to any desired location. To lock crossbar 11 in place, lock pins 68 are aligned with an associated pair of apertures 36 in guide rails 9 and 10 at the desired location. Set screw 49 is then loosened or released, such that coil spring 51 resiliently extends end leg 47 outwardly thereby diverging end fittings 46 into the locked position illustrated in FIG. 3. In the locked position, the pads 62 on abutment surfaces 61 engage the adjacent web walls 23 of vehicle sidewalls 6 and 7, and the lock pins 68 are closely received into the selected mating apertures 36 in guide rails 9 and 10. The outer flanges 60 of end fittings 46 and 48 are spaced apart from the associated vertical plates 58 a distance which permits lock pins 68 to retract fully from the associated apertures 36 in guide rails 9 and 10 in the unlocked position. Preferably, the distance betwen the outer ends of lock pins 68 and the inner surfaces of outer flanges 60 is two to three times the thickness of guide bars 9 and 10, as illustrated in FIGS. 3 and 4, to prevent binding as crossbar 11 is moved in the fore-to-aft direction. It is important to note that in the locked position (FIG. 3), the vertical plates 58 of end fittings 46 are spaced apart from the adjacent exterior faces 32 of the guide rails 9 and 10, such that they do not touch or abut. In this manner, substantially all laterally directed stabilizing forces which are developed in reaction to retaining the cargo in its selected position within the bed 3 of the vehicle are transferred directly to the sidewalls 6 and 7 of the vehicle bed 3, and do not act on guide rails 9 and 10.

It is to be understood that the present invention contemplates other types of latches 7 to positively locate crossbar 11 on guide rails 9 and 10 in the fore-to-aft direction. For instance, guide rails 9 and 10 may be provided with a toothed rack (not shown) positioned on their interior faces 32 which mate with similarly shaped pawls (not shown) on the vertical plates 58 of end fittings 46 and 48. Extension and retraction of crossbar 11 between the locked and unlocked positions would engage and disengage the pawls from the toothed racks.

End fittings 46 and 48 preferably include a pair of lock apertures 55 through each vertical plate 58 on opposite sides of the associate lock pin 68. Lock apertures 58 are positioned to align with guide rail apertures 36 when crossbar 11 is in the locked position (FIG. 3), and are of a substantially coextensive diameter therewith to permit a conventional padlock 56 (FIG. 6) to be inserted through lock apertures 58 and aperatures 36 at both end fittings 46 and 48. Since guide rails 9 and 10 are spaced apart from the adjacent vehicle sidewalls 6 and 7 by spacers 40, the gap formed therebetween permits the padlocks 56 to be readily attached to both ends of cargo stabilizer 1, and thereby lock crossbar 11 to the vehicle. When hauling bicycles, motorcycles, snowmobiles, and other similar irregularly shaped objects, crossbar 11 is preferably inserted either through or adjacent the open framework of the article. Hence, the article cannot be removed from the vehicle without unlocking both padlocks 56.

Cargo stabilizer 1 (FIGS. 1 and 2) preferably includes at least one stabilizer arm 72 attached to crossbar 11. In the illustrated example, stabilizer arm 72 comprises a tubular leg 73 having an annular sleeve 74, which is rigidly attached to one end thereof, and is closely received over the crossbar tube 45. With reference to FIG. 5, a set screw 75 with a handle-shaped outer end 76 is mounted in sleeve 74, and engages the exterior surface of crossbar tube 45 when locked in position. Preferably, sleeve 74 has an annular shape, such that arm 72 can be rotated around tube 45 to facilitate engaging all types of cargo, and accomodate many different situations. A resilient cover or foot 77 is attached to the free end of leg 73, and is designed to prevent scratching or marring the finish of vehicle bed 3. The illustrated leg 73 has a slight Z-shape in front elevation, such that the outermost portion 78 of leg 73 has its exterior surface substantially coplanar with the adjacent side edge of sleeve 74. The offset or crook 78 in arm 72 greatly facilitates securely engaging different types and shapes of cargo, and permits two stabilizer arms 72 to be used together on crossbar 11 for maximum efficiency, as described hereinafter. In the cargo stabilizer 1 illustrated in FIGS. 1 and 2, two stabilizer arms 72 are mounted on crossbar 11, with the inwardly bent portions 78 oriented inwardly toward each other. Hence, when both stabilizer arms 72 are positioned immediately adjacent to one another in a side-by-side fashion, the legs 73 can be oriented in a triangular pattern to form a single plane to hold cargo against one of the vehicle sidewalls 6 and 7.

Cargo stabilizer 1 may be installed in the illustrated pickup truck 2 in the following fashion. Guide rails 9 and 10 are positioned adjacent the opposite vehicle sidewalls 6 and 7, with their upper edges 30 positioned slightly lower and parallel with the upper flange 21 of the sidewall lip 20, as best illustrated in FIGS. 3 and 4. Holes are then drilled through the web walls 23 of lip 20 at each fastener aperture 37 in the guide rails 9 and 10. Guide rails 9 and 10 are mutually positioned so that mating apertures 36 are located directly opposite one another. This relationship can be assured by positioning the front and rear ends of guide rails 9 and 10 a predetermined, equal distance from the adjacent front wall 5 and rear wall 8 of vehicle bed 3. Guide rails 9 and 10 can then be used as a template to locate fastener apertures 37. Spacers 40 are then positioned between the sidewalls 6 and 7 of vehicle bed 3 and the associated guide rails 9 and 10, and fasteners 41 are inserted through fastener apertures 37 and spacers 40, and threaded into just drilled apertures in the web walls 23 of the vehicle sidewalls 6 and 7. After each set of fasteners 41 and spacers 40 have been installed, crossbar 11, with leg 47 in the unlocked position, is positioned on top of guide rails 9 and 10, so that the top flanges 59 of end fittings 46 and 48 slidingly support crossbar 11 on the upper edges 30 of guide rails 9 and 10. Crossbar 11 can be placed on guide rails 9 and 10 with set screw 49 oriented at either side of the vehicle bed to accommodate both right-handed and left-handed users.

Cargo stabilizer 1 can be used in a wide variety of different ways to stabilize cargo of various shapes and sizes, and to accommodate different situations and circumstances. In the example illustrated in FIG. 2, an article of cargo 85 is positioned in the bed 3 of pickup truck 2. In this example, the cargo 85 is shoved flush against the rear gate 8 of vehicle bed 3. Crossbar 3 is then slid along guide rails 9 and 10 until stabilizer tube 45 engages the forward surface of cargo 85. Set screw 49 is then released, and end fittings 46 and 48 are adjusted in a fore-to-aft direction so that lock pins 68 engage the nearest pair of apertures 36 in guide rails 9 and 10. Set screw 49 is then tightened so that the crossbar 11 will remain in the locked position at the selected location. Cargo 85 is thus captured between the rear gate 8 of the pickup truck, and crossbar 11, and prevents fore-to-aft movement of the cargo 85. Stabilizer arms 72 are then adjusted laterally inwardly to abut the side surfaces of the cargo 85. The set screws 75 on stabilizer arm 72 are tightened, so as to lock both stabilizer arms 72 in the selected position, and thereby prevent lateral motion of the cargo 85 within the bed 3 of pickup truck 2.

It is to be understood that stabilizer arm 72 can be adjusted laterally and pivotally with respect to crossbar 11 to stabilize a wide variety of different types of cargo. Furthermore, a third stabilizer arm (not shown) may be attached to crossbar 11, or one of the two illustrated stabilizer arms 72 can be used to hold the cargo 85 down in the vertical direction.

Cargo stabilizer 1 provides an uncomplicated, economical stabilizing system that is particularly designed as an aftermarket accessory for use with commercial utility vehicles, such as vans, pickup trucks and the like. Because lateral stabilization forces are transferred directly to the sidewalls 6 and 7 of the vehicle, guide rails 9 and 10 need not be of a heavy-duty construction, and need not be attached to the vehicle sidewalls 6 and 7 by a complicated fastening system, such as through bolts or the like, but can use sheet metal-type screws, pop rivets, or similar fasteners. This feature permits the average user to easily install the stabilizer himself in a utility vehicle for recreational uses, and everyday household uses. Stabilizer arms 72 permit the user to stabilize all different shapes of cargo in both the fore-to-aft and side-to-side directions.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A cargo stabilizer for utility vehicles, such as pickup trucks, vans, and the like, of the type having a cargo carrying bed defined by a floor and opposite sidewalls; said cargo stabilizer comprising:

first and second elongated guide rails shaped to extend lengthwise along the opposite sidewalls of the vehicle bed in a generally mutually parallel relationship;

means for rigidly connecting said guide rails to the sidewalls of the vehicle bed;

a crossbar extending laterally between said guide rails and including end fittings connected with opposite ends of said crossbar which abut said guide rails and slidingly support said crossbar thereon for fore-to-aft translation along the length of said guide rails;

means on said crossbar for engaging cargo disposed within the bed of the vehicle to retain the cargo in a selected position therein;

means for adjusting the length of said crossbar between an extended, locked position and a retracted, unlocked position;

means for releasably retaining said crossbar in the locked position;

means on said end fittings for adjustably and positively connecting the opposite ends of said crossbar with said guide rails when said crossbar is in the locked position to positively prevent fore-to-aft movement of said crossbar from the selected position; said connecting means shifting between the locked and unlocked positions in response to extension and retraction of said crossbar;

first and second abutment surfaces positioned on the end fittings of said crossbar, and shaped to abut the adjacent sidewalls of the vehicle bed when said crossbar is in the locked position, whereby substantially all laterally directed stabilizing forces which act on said cargo engaging means in reaction to retaining the cargo in its selected position within the bed of the vehicle are transferred directly to the sidewalls of the vehicle bed, and do not act on said guide rails, thereby providing very secure stabilizing support without requiring heavy-duty stabilizer construction.

2. A cargo stabilizer as set forth in claim 1, wherein said guide rail connecting means comprises:

a plurality of spacers positioned between said guide rails and the opposite sidewalls of the vehicle bed at preselected locations along the length of said guide rails, and including means for retaining the same therebetween; and fasteners connecting said guide rails with the sidewalls of the vehicle bed.

3. A cargo stabilizer as set forth in claim 2, wherein:
said fasteners comprise sheet metal-type screws which are inserted into and removable from the sidewalls of the vehicle bed from the interior of the vehicle bed for ease of installation.

4. A cargo stabilizer as set forth in claim 3 wherein said means for connecting the opposite ends of said crossbar with said guide rails comprises:

a plurality of apertures spaced along the length of each of said first and second guide rails; said apertures of said first guide rail being positioned substantially opposite corresponding apertures of said second guide rail when said guide rails are connected with the sidewalls of the vehicle bed; and first and second lock pins; said first lock pin extending outwardly from one end of said crossbar and said second lock pin extending outwardly from the other end of said crossbar; said lock pins being closely received into a laterally opposite pair of said guide rail apertures to positively prevent fore-to-aft and vertical movement of said crossbar from the selected position.

5. A cargo stabilizer as set forth in claim 4, wherein:
said crossbar ends include laterally extending lock apertures therethrough which align with an associated pair of said guide rail apertures when said crossbar is in the locked position; and including first and second locks, having locking portions thereof extending through said lock apertures and said associated guide rail apertures when said crossbar is in the locked posiiton to prevent unauthorized removal of the cargo from the vehicle bed.

6. A cargo stabilizer as set forth in claim 5, wherein:
said crossbar comprises first and second members with adjacent ends telescopingly interconnected to define said crossbar length adjusting means.

7. A cargo stabilizer as set forth in claim 6, wherein said crossbar retaining means comprises:

a set screw mounted in one of said crossbar members and engaging the other of said crossbar members in the locked position.

8. A cargo stabilizer as set forth in claim 7, including:
a spring connected with said crossbar, and resiliently urging said crossbar members toward the extended locked position.

9. A cargo stabilizer as set forth in claim 8, wherein:
said set screw includes a handle for manually manipulating said set screw between locked and unlocked positions without a tool; and said set screw handle is positioned in a normally downwardly extending orientation to avoid interference with covers for the vehicle bed.

10. A cargo stabilizer as set forth in claim 9, wherein:
said abutment surfaces include resilient, non-scratch pads to avoid damage to the sidewalls of the vehicle bed.

11. A cargo stabilizer as set forth in claim 10, wherein:

said crossbar members are rigid, and have an exterior surface adapted to abut cargo in the bed of the vehicle to stabilize the same against fore-to-aft motion, and thereby define at least a portion of said cargo engaging means.

12. A cargo stabilizer as set forth in claim 11, wherein:

said cargo engaging means further comprises at least one arm having one end detachably connected with said crossbar for adjustment therealong, and the other end extending generally outwardly from said crossbar to engage the cargo.

13. A cargo stabilizer as set forth in claim 12, wherein:

said arm at one end includes a sleeve slidingly received over said crossbar, with a set screw therein for adjustably retaining said arm on said crossbar at a desired orientation.

14. A cargo stabilizer as set forth in claim 13, wherein:

said crossbar members include a cylindrically shaped portion on which said arm is mounted to permit said arm to be both laterally and pivotally adjustable on said crossbar.

15. A cargo stabilizer as set forth in claim 14, wherein:

said cargo engaging means comprises a second one of said arm, between which the cargo is retained for lateral stability in the vehicle bed.

16. A cargo stabilizer as set forth in claim 15, wherein:

said arms have a mating, geneaerlly Z-shaped configuration to stabilize narrow articles therebetween.

17. A cargo stabilizer as set forth in claim 16, wherein:

said guide rails are positioned below the top of the vehicle bed sidewalls a predetermined distance such that said crossbar is located below the top of the vehicle bed sidewalls to avoid interference with covers for the vehicle bed.

18. A cargo stabilizer as set forth in claim 1 wherein said means for connecting the opposite ends of said crossbar with said guide rails comprises:

a plurality of apertures spaced along the length of each of said first and second guide rails, said apertures of said first guide rail being positioned substantially opposite corresponding apertures of said second guide rail when said guide rails are connected with the sidewalls of the vehicle bed; and first and second lock pins, said first pin extending outwardly from one end of said crossbar and said second pin extending outwardly from the other end of said crossbar, said pins being closely received into a laterally opposite pair of said guide rail apertures to positively prevent fore-to-aft and vertical movement of said crossbar from the selected position.

19. A cargo stabilizer as set forth in claim 1, wherein:
said crossbar comprises first and second tubes with adjacent ends telescopingly interconnected to define said crossbar length adjusting means.

20. A cargo stabilizer as set forth in claim 19, wherein:
said crossbar members are rigid, and have an exterior surface adapted to abut cargo in the bed of the vehicle to stabilize the same against fore-to-aft motion, and thereby define at least a portion of said cargo engaging means.

21. A cargo stabilizer as set forth in claim 1, wherein:
said abutment surfaces include resilient, non-scratch pads to avoid damage to the sidewalls of the vehicle bed.

22. A cargo stabilizer as set forth in claim 1, wherein:
said cargo engaging means comprises at least one arm having one end detachably connected with said crossbar for adjustment therealong, and the other end extending generally outwardly from said crossbar to engage the cargo.

23. A cargo stabilizer as set forth in claim 22, wherein:
said crossbar has a cylindrical shape, and permits said arm to be both laterally and pivotally adjustable on said crossbar.

24. A cargo stabilizer as set forth in claim 1, wherein:
said guide rails are positioned below the top of the vehicle bed sidewalls a predetermined distance such that said crossbar is located below the top of the vehicle bed sidewalls to avoid interference with covers for the vehicle bed.

25. In combination with utility vehicles, such as pickup trucks, vans, and the like, of the type having a cargo carrying bed defined by a floor and opposite sidewalls, a cargo stabilizer for stabilizing a load carried within said bed, said cargo stabilizer comprising:

first and second elongated guide rails extending lengthwise along the opposite sidewalls of said vehicle bed in a generally mutually parallel relationship;

means for rigidly connecting said guide rails to the sidewalls of said vehicle bed;

a crossbar extending laterally between said guide rails, and including end fittings connected with opposite ends of said crossbar which abut said guide rails and slidingly support said crossbar thereon for fore to-aft translation along the length of said guide rails;

means on said crossbar for engaging a load disposed within the bed of said vehicle to retain the load in a selected position therein;

means for adjusting the length of said crossbar between an extended, locked position and a retracted, unlocked position;

means for releasably retaining said crossbar in the locked position;

means on said end fittings for adjustably and positively connecting the opposite ends of said crossbar with said guide rails when said crossbar is in the locked position to positively prevent fore-to-aft movement of said crossbar from the selected position; said connecting means shifting between the locked and unlocked positions in response to extension and retraction of said crossbar; and first and second abutment surfaces positioned on the end fittings of said crossbar, and shaped to abut the adjacent sidewalls of said vehicle bed when said crossbar is in the locked position, whereby substantially all laterally directed stabilizing forces which act on said cargo engaging means in reaction to retaining the cargo in its selected position within the bed of said vehicle are transferred directly to the sidewalls of said vehicle bed, and do not act on said guide rails, thereby providing very secure stabilizing support without requiring heavy-duty stabilizer construction.

26. A cargo stabilizer as set forth in claim 25, wherein said guide rail connecting means comprises:
a plurality of spacers positioned between said guide rails and the opposite sidewalls of said vehicle bed at preselected locations along the length of said guide rails, and including means for retaining the same therebetween; and fasteners connecting said guide rails with the sidewalls of said vehicle bed.

27. A cargo stabilizer as set forth in claim 26, wherein:
said fasteners comprise sheet metal-type screws which are inserted into and removable from the sidewalls of said vehicle bed from the interior of said vehicle bed for ease of installation.

28. A cargo stabilizer as set forth in claim 27, wherein:
said crossbar ends include laterally extending lock apertures therethrough which align with an associated pair of said guide rail apertures when said crossbar is in the locked position; and including first and second locks, having locking portions thereof extending through said lock apertures and said associated guide rail apertures when said crossbar is in the locked position to prevent unauthorized removal of the cargo from said vehicle bed.

29. A cargo stabilizer as set forth in claim 28, wherein:
said crossbar comprises first and second members with adjacent ends telescopingly interconnected to define said crossbar length adjusting means;

said crossbar retaining means comprises a set screw mounted in one of said crossbar members and engaging the other of said crossbar members in the locked position;

said crossbar members are rigid, and have a cylindrical exterior surface adapted to abut cargo in the bed of the vehicle to stabilize the same against fore-to-aft motion, and thereby define at least a portion of said cargo engaging means; and said cargo engaging means further comprises at least one arm having one end detachably connected with said crossbar for adjustment therealong, and the other end extending generally outwardly from said crossbar to engage the cargo.

30. A cargo stabilizer kit having component parts capable of being assembled in utility vehicles of the type having a cargo carrying bed defined by a floor and opposite sidewalls, said kit comprising:
    first and second elongated guide rails adapted to extend lengthwise along the opposite sidewalls of the vehicle bed in a generally mutually parallel relationship;
    a plurality of fasteners adapted to rigidly connect said guide rails to the sidewalls;
    a crossbar adapted to extend laterally between said guide rails, and including end fittings connected with opposite ends of said crossbar which operably abut said guide rails and slidingly support said crossbar thereon for fore-to-aft translation along the length of said guide rails when said guide rails are connected to the vehicle sidewalls; said crossbar being adjustable in length between an extended, locked position and a retracted, unlocked position, and including a lock for releasably retaining said crossbar in the locked position, said crossbar including:
        latches connected with the end fittings of said crossbar to adjustably and positively attach said crossbar to said guide rails to prevent fore-to-aft movement of said crossbar; said latches shifting between the locked and unlocked positions in response to extension and retraction of said crossbar; and
        abutment surfaces at the end fittings of said crossbar adapted for abutting the adjacent sidewalls of the vehicle bed, whereby when said kit is assembled in a vehicle bed, substantially all laterally directed forces which act on said crossbar in reaction to retaining the cargo in a selected position with the vehicle bed are transferred directly to the sidewalls of the vehicle bed, and do not act on said guide rails, thereby providing very secure stabilizing support without requiring heavy duty stabilizer construction.

31. A cargo stabilizer kit as set forth in claim 30, including:
    a cargo engaging arm having a sleeve at one end thereof closely received over said crossbar for sliding adjustment along the length of said crossbar with a set screw to retain said arm at a selected position.

32. A cargo stabilizer kit as set forth in claim 31 wherein said guide rail fasteners comprise:
    a plurality of spacers adapted to be positioned between said guide rails and the opposite sidewalls of the vehicle bed at preselected locations along the length of said guide rails; and
    fasteners for connecting said guide rails and said spacers to the sidewall.

33. A cargo stabilizer kit as set forth in claim 32 wherein said fasteners are sheet metal-type screws.

34. A cargo stabilizer kit as set forth in claim 33, wherein said latches comprise:
    a plurality of apertures spaced along the length of each of said first and second guide rails, said apertures of said first guide rail being positioned substantially opposite corresponding apertures of said second guide rail when said guide rails are connected with the sidewalls of the vehicle bed; and
    first and second lock pins, said first lock pin extending outwardly from one end of said crossbar and said second lock pin extending outwardly from the other end of said crossbar, said lock pins being closely received into a laterally opposite pair of said guide rail apertures to positively prevent fore-to-aft and vertical movement of said crossbar from the selected position.

35. A cargo stabilizer kit as set forth in claim 34, including:
    lock apertures extending laterally through the opposite ends of said crossbar and being positioned for alignment with an associated pair of said guide rail apertures when said crossbar is in the locked position;
    first and second locks having locking portions thereof adapted to extend through said lock apertures and said associated guide rail apertures when said crossbar is in the locked position to prevent unauthorized removal of the cargo from the vehicle.

36. A cargo stabilizer kit as set forth in claim 35, wherein said crossbar comprises:
    first and second tubes with adjacent ends telescopingly interconnected;
    a set screw mounted in one of said crossbar tubes and engaging the other of said crossbar tubes in the locked position; and
    a spring connected with said crossbar resiliently urging said crossbar tubes toward the extended locked position.

* * * * *